United States Patent [19]

Johnson

[11] 3,827,772
[45] Aug. 6, 1974

[54] MOBILE COMMUNICATION CONSOLE

[76] Inventor: Frederick Mark Johnson, P.O. Box 102, South Weymouth, Mass. 02190

[22] Filed: June 20, 1973

[21] Appl. No.: 371,857

[52] U.S. Cl............ 312/7 R, 224/42.42 R, 248/13, 296/37 R
[51] Int. Cl.............................................. B60r 7/04
[58] Field of Search ....... D56/4 B, 4 R; 206/19.5 R, 206/19.5 B; 296/37 R; 108/44; 325/352, 361, 21, 66, 312; 224/42.42 R, 29 R, 29 D; 248/13; 312/242, 245, 7 R, 7 TV

[56] References Cited
UNITED STATES PATENTS
2,929,590  3/1960  Thomas .............................. 248/13
3,405,944  10/1968  Krechman....................... 325/312 X
3,550,001  12/1970  Hanley.................. 224/42.42 R UX
3,589,577  6/1971  Bassinger..................... 224/42.42 R
3,632,158  1/1972  Boothe............................. 296/37 R Primary Examiner—Donald A. Griffin
Attorney, Agent, or Firm—Weingarten, Maxham & Schurgin

[57] ABSTRACT

A communication console for two-way radio equipment used in automobiles. The console provides theft-proof mounting adjacent the driver for radio equipment including controls, speakers, microphones and walkie-talkies. Provisions are made for easy access to the equipment housed within the console.

11 Claims, 4 Drawing Figures 3,827,772

MOBILE COMMUNICATION CONSOLE

FIELD OF THE INVENTION

This invention relates in general to communications equipment and more specifically concerns a two-way radio communication console for mobile use.

DISCUSSION OF THE PRIOR ART

Previously it has been generally necessary, when an automobile is equipped with a significant amount of two-way radio equipment, that much of the equipment be mounted in various areas in the vicinity of the dashboard. This is especially true of police vehicles. With such equipment mounted to and under the dash in different positions, it was subject to poor accessibility, theft, incidental damage and could cause injury to the occupants of the vehicle.

One prior art device provided a housing which was quite similar in overall shape with the present invention. However, this earlier configuration had many relatively sharp edges, including brackets for the microphones and walkie-talkies. Accessibility to the interior of the housing to replace or service equipment was also somewhat limited. Furthermore, the vertical member upon which the housing was mounted was vertically adjustable and this was not always satisfactory because the adjustment could at times loosen, allowing the console to move downward out of its desired position. The prior console also could be tilted to different angles, causing problems of a similar nature. Additionally, no effective provisions were previously made to prevent theft of the equipment from the automobile.

SUMMARY OF THE INVENTION

This invention provides an improved communication console for mobile units such as police cars. The console is adaptable to radios of any relatively standard configuration. A walkie-talkie holder is mounted to one side of the console and is shaped to provide minimum danger to a person in the front passenger seat. Microphone hangers may be mounted in a position which holds the microphone outward from the console, or they may be reversed so that the microphones are mounted in a position inward from the edge of the console. The vertical support is mounted to the central drive shaft hump of an automobile and the console is mounted to the vertical supporting member. Substantially theft-proof means are used in securing the console within an automobile and the equipment within the console. The console is longitudinally adjustable fore and aft so that it may be mounted in a position to suit the driver.

An alternative embodiment for compact cars provides a shorter console and a speaker mounting beneath the console so that the unit is more compact. Another embodiment employs a pedestal for upright mounting to the floor between the seats of a van or other twin seat type vehicle.

BRIEF DESCRIPTION OF THE DRAWING

The advantages, features and objects of this invention will be more clearly understood from the following detailed description when taken in conjunction with the drawing in which.

DESCRIPTION OF THE PREFERRED EMBODIMENTS

Figure 2:
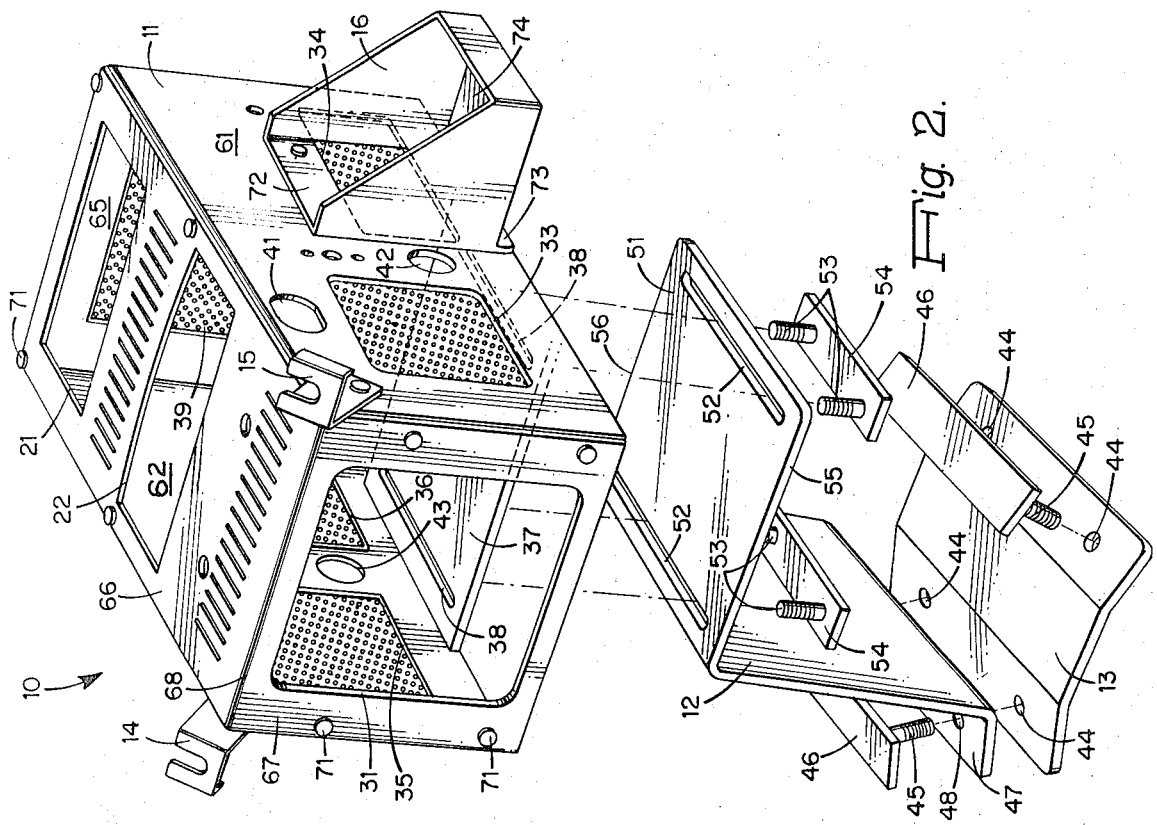
FIG. 2 is an exploded perspective view of the console of FIG. 1, without the radio equipment.
Figure 1:
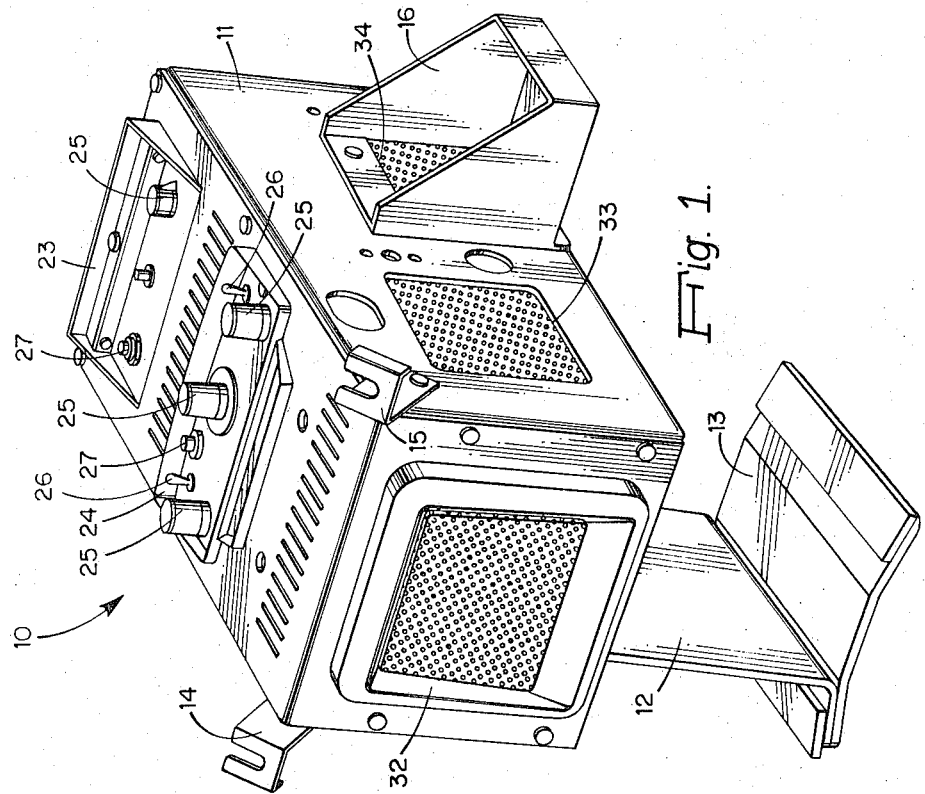
FIG. 1 is a perspective view of a communication console constructed in accordance with this invention, showing typical radio equipment mounted therein.

With reference now to the drawing, FIGS. 1 and 2 show communication console 10, comprising housing 11, supported by Z-shaped vertical support member 12, mounted to base plate 13. Microphone hangers 14 and 15 are secured to either side at the top rearward corners of the housing, and walkie-talkie holder 16 is mounted to one side of the housing. The housing is formed with openings 21 and 22 through which communication equipment control panels project. Typical elements shown on control panels 23 and 24 are knobs 25, switches 26 and indicator lights 27. It should be noted that opening 22 in FIG. 1 would have a somewhat different configuration than the opening shown in FIG. 2. Such openings may have any configuration as necessary to accommodate a particular control panel shape. Opening 31 in the rearward facing end of the housing is adapted to accommodate speaker assembly 32. Several openings 33, 34, 35, 36 and 39 are provided in the sides and front of the housing. These openings are normally covered by a perforated fabric which may be of metal, plastic or other suitable material, and they provide access for circulating air for purposes of cooling the electronic equipment within housing 11. Furthermore, a substantial portion of the bottom of the housing is open, normally about one-half of it being covered by mounting plate 37, having slots 38 formed therein. The console is also formed with smaller openings, for example, 41, 42 and 43, to provide access for cords and cables to connect the equipment within the housing to external elements such as microphones, power supplies and antennas.

Base plate 13 is formed with a concave side to fit on the central drive shaft hump of an automobile, but it is equally adaptable to a flat floor if desired. Holes 44 provide openings for threaded studs 45 which are secured by butt welding or other suitable means to plates 46. Corresponding holes are drilled through the automobile floor or hump so that studs 45 may pass through holes 44 and the holes in the automobile so that mating nuts (not shown) may be secured to the distal ends of the studs to thereby secure plate 13 to the automobile. At the same time, upstanding support member 12 is secured to plate 13 as shown in FIG. 2 wherein flange 47 of support member 12 is provided with holes 48 to receive studs 45 therein.

Generally horizontal upper flange 51 of support member 12 is provided with slots 52 through which threaded studs 53 mounted to plates 54 may pass. Stud and plate combinations 53, 54 are similar to stud and plate combinations 45, 46 and each combination is a rigid unitary structure. Slots 52 are adapted to register with slots 38 in mounting plate 37 of housing 11 so that the housing may be secured to support member 12 by means of nuts (not shown) which mate with the ends of studs 53 within the housing. The rearward end 55 of flange 51 is normally slightly lower than the forward end 56 thereof with respect to the horizontal. This is because the vehicle hump normally slopes at the location where plate 13 is mounted. Flange 51 is substantially parallel to the top of plate 13. It may also be seen that sides 61 and 62 are wider at their forward end than at their rearward end so that the top of the console has a built-in slope. This, combined with the normal installation incline, ensures that the housing will normally tilt downwardly at the rearward end facing the driver's seat. This characteristic provides easy access to the equipment controls and at the same time prevents foreign objects from being placed on top of the console.

It may be seen that while the vertical height of the housing and the tilt thereof are fixed, it may be moved longitudinally because of mating slots 38 and 52 through which studs 53 pass. Furthermore, with the studs 45 and 53 formed as a part of plates 46 and 54 respectively, it is evident that the console and its contents are relatively theft-proof in that there is no easy access to any quick and simple means for dismounting the console when mounted as shown in FIG. 1.

The sides 61 and 62 of the housing are formed with appropriate flanges to which are mounted top 66 and back 67. Top 66 and back 67 are preferably unitary and a rounded top surface 68 is formed at the transition therebetween so that by removal of screws 71 from the back and top of the housing, this L-shaped plate may be removed for easy access to the contents. Screws 71 are tamper-proof in that a special tool is required for their removal, further ensuring against theft. Sides 61, 62 and front 65 may be formed together as a unitary U-shaped element. Microphone hangers 14 and 15 may be permanently mounted to sides 61 and 62 of the housing in the position shown in FIGS. 1 and 2, or they may be removably mounted by appropriate bolts so that they can be reversed to the positions shown in FIG. 3. This would normally be a matter of preference for the equipment operators.

The walkie-talkie holder 16, mounted to side 61, is formed with top strap 72 and bottom flange 73 which is unitary with bottom plate 74. The top strap and bottom flange are used for securely mounting the walkie-talkie holder to the side of the housing by appropriate conventional means. The remainder of the back of the holder is open so that opening 34 in the side of the housing is not obstructed. The bottom of the holder is solid to support the walkie-talkie.

The console of this invention is adapted to combine, in one convenient location, most of the auxiliary equipment and their controls which do not relate to operation of the automobile. For example, the roof light and siren or wailer control switches may extend through the two holes in top 66 located just rearwardly of opening 22. Other functional devices may be included as necessary.

Figure 3:
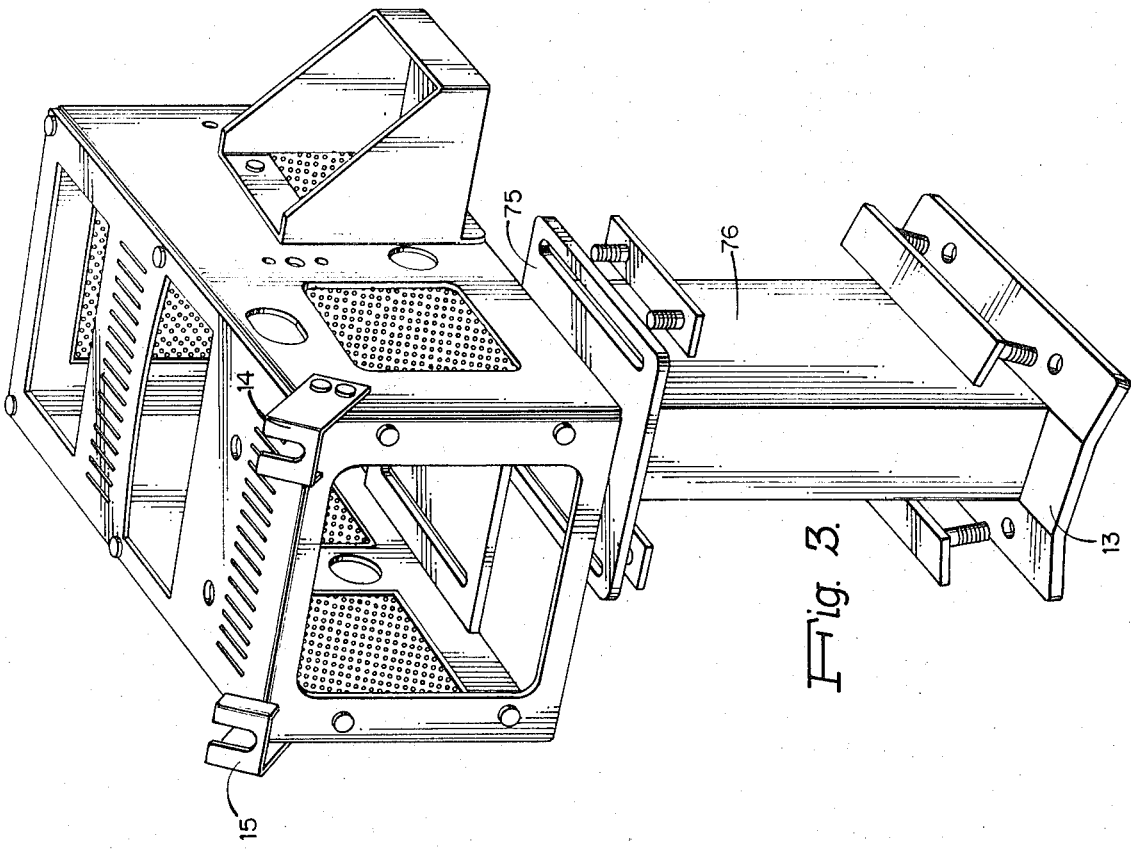
FIG. 3 is an exploded view similar to FIG. 2, showing an alternative embodiment of the vertical support for vans or twin seat type vehicle.

The embodiment shown in FIG. 3 is modified in that the support member for connecting base plate 13 to top plate or flange 75 which is equivalent to flange 51, is a pedestal 76. This configuration differs somewhat from the Z-bracket 12 shown in FIGS. 1 and 2, but the configuration of FIG. 3 is otherwise the same as has been described. The alternative mounting of microphone brackets 14 and 15 is also shown in this drawing.

The pedestal embodiment is particularly useful for van or other twin seat type vehicles, whether or not they have a middle hump. The relatively thin pedestal permits the console to be mounted between the seats of such vehicles.

Figure 4:
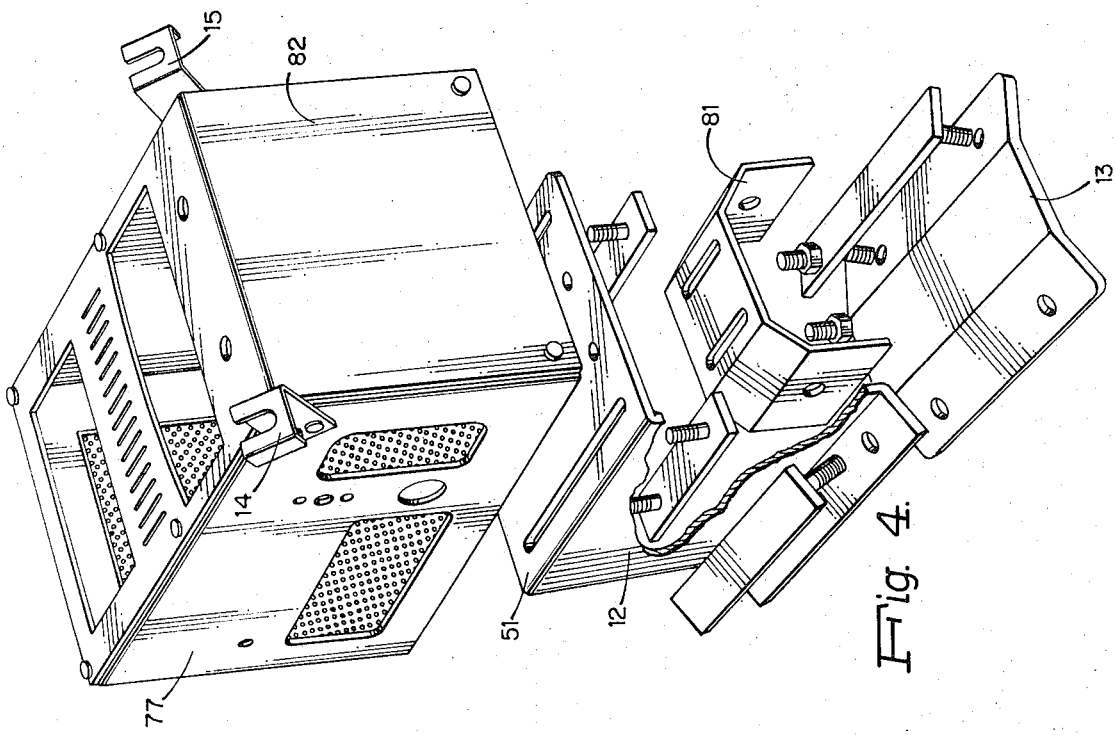
FIG. 4 is an exploded view of the other side of an alternative embodiment of the console specifically designed for use in compact automobiles.

FIG. 4 is another embodiment of the console for use in compact cars. Housing 77 is made shorter than the configuration previously discussed with commensurate differences in the side openings of the housing. An inverted U-shaped bracket 81 is mounted to the bottom of flange 51 of Z-shaped support member 12 to which is mounted the speaker used with the equipment within housing 77. Since the speaker is located externally of the housing, the front 82 need not have an opening therein as was necessary in the previously discussed configuration. The walkie-talkie holder which is normally mounted on the right side of the housing is not visible in this drawing. It is evident that the holder could be mounted to the left side if desired, but it is preferably on the other side so as not to interfere with the driver. The configuration of FIG. 4 is otherwise substantially identical to the configurations previously described.

In view of the above description, it is likely that modifications and improvements will occur to those skilled in the art which are within the scope of this invention.

What is claimed is:

1. A mobile communication console comprising:
   a base plate having a concave side adapted to accommodate the drive shaft hump of an automobile;
   a rigid upright support secured to said base plate and having a first flange spaced from and substantially parallel to the top of said base plate, said first flange being formed with longitudinal slots therethrough;
   a housing for enclosing communication equipment, said housing having a bottom mounting plate with longitudinal slots formed therein in registration with said slots in said first flange; and
   means for removably connecting said housing to said first flange to permit longitudinal adjustments therebetween.

2. The mobile communication console recited in claim 1 and further comprising at least one microphone hanger secured to one upper rear corner of said housing.

3. The mobile communication console recited in claim 2 wherein the top and rear plates of said housing are formed of a single sheet of material and the transition between said top and rear plates provides a smoothly rounded top rear edge of said housing.

4. The mobile communication console recited in claim 3 wherein said top plate of said housing is inclined with respect to the horizontal.

5. The mobile communication console recited in claim 2 wherein said upright support is a Z-shaped element having a second flange secured to said base plate.

6. The mobile communication console recited in claim 2 wherein said upright support is a pedestal.

7. The mobile communication console recited in claim 2 and further comprising a walkie-talkie holder mounted to one side of said housing, said walkie-talkie holder having a back secured to said housing and sloping downwardly toward the front, said holder being formed with a solid bottom on which the walkie-talkie rests.

8. The mobile communication console recited in claim 2 wherein said microphone hanger is reversible to project outwardly from said housing and alternatively to be mounted on the opposite rear corner of said housing to project within the profile thereof.

9. The mobile communication console recited in claim 1 wherein said base plate is secured to the automobile by means of threaded studs arranged in pairs and extending from flat plates, the heads of said studs thereby being inaccessible for purposes of removal.

10. The mobile communication console recited in claim 9 wherein said means for removably connecting said housing to said first flange comprises threaded studs arranged in pairs and extending from flat plates through said slots in said first flange and said mounting plate, the heads of said studs thereby being inaccessible for purposes of removal.

11. The mobile communication console recited in claim 1 and further comprising a U-shaped bracket mounted to said first flange beneath said housing and adapted to retain a loud speaker mounted thereto.

* * * * *